United States Patent [19]

Lundberg et al.

[11] 4,322,329

[45] Mar. 30, 1982

[54] PROCESS FOR CONTROLLED GELATION OF POLYMERIC SOLUTION (C-971)

[75] Inventors: Robert D. Lundberg, Bridgewater, N.J.; Dennis E. O'Brien, Houston, Tex.; Henry S. Makowski, deceased, late of Scotch Plains, N.J., by Patricia H. Makowski, executrix; Robert R. Klein, Berkeley Heights, N.J.

[73] Assignee: Exxon Research & Engineering Co., Florham Park, N.J.

[21] Appl. No.: 136,837

[22] Filed: Apr. 3, 1980

Related U.S. Application Data

[63] Continuation-in-part of Ser. No. 106,027, Dec. 21, 1979, Pat. No. 4,282,130, which is a continuation-in-part of Ser. No. 930,044, Aug. 1, 1978, abandoned.

[51] Int. Cl.$^3$ .............................................. C08F 8/36
[52] U.S. Cl. ...................... 524/389; 524/390; 524/385; 524/386; 523/130; 524/140; 524/210; 524/111; 524/916; 524/576; 524/566; 524/475
[58] Field of Search ................. 260/29.6 SQ, 29.6 N, 260/29.6 E, 29.6 PM, DIG. 31; 525/344

[56] References Cited

U.S. PATENT DOCUMENTS

| | | | |
|---|---|---|---|
| 2,809,959 | 10/1957 | Roth | 526/31 |
| 2,813,087 | 11/1957 | Roth | 260/29.6 SQ |
| 3,554,287 | 1/1971 | Eilers | 260/29.6 SQ |
| 3,870,841 | 3/1975 | Makowski | 260/DIG. 31 |
| 3,888,945 | 6/1975 | Arndt | 260/29.6 PM |
| 4,157,432 | 6/1979 | Lundberg | 525/344 |
| 4,226,751 | 10/1980 | Lundberg | 260/DIG. 31 |

*Primary Examiner*—Paul R. Michl
*Attorney, Agent, or Firm*—Richard E. Nanfeldt

[57] ABSTRACT

The present invention relates to a process for forming a polymeric solution or gel having a viscosity of less than about 50,000 cps which includes the steps of forming a solvent system of an organic liquid and a polar cosolvent, the polar cosolvent being less than about 15 wt. % of the solvent system, a viscosity of the solvent system being less than about 1,000 cps: dissolving a neutralized sulfonated polymer in the solvent system to form a solution, a concentration of the neutralized sulfonated polymer in the solution being about 0.5 to about 20 wt. %, a viscosity of the solution being about 5 to about 5,000 cps; and adding about 1 to about 500 vol. % water to the solution having a viscosity less than about 5,000 cps, the water being immiscible with the solution and the polar cosolvent transferring from the solution phase to the water phase thereby causing the viscosity of said solution to increase by a factor of at least 2 to less than 50,000 cps.

36 Claims, No Drawings

PROCESS FOR CONTROLLED GELATION OF POLYMERIC SOLUTION (C-971)

CROSS-REFERENCE TO RELATED APPLICATIONS

This application is a CIP of U.S. Ser. No. 106,027 filed Dec. 21, 1979, now U.S. Pat. No. 4,282,130, which in turn is a CIP of U.S. Ser. No. 930,044 filed Aug. 1, 1978 which is now abandoned.

BACKGROUND OF THE INVENTION

1. Field of the Invention

The present invention relates to a process for forming a polymeric solution or gel having a viscosity of less than about 50,000 cps which includes the steps of forming a solvent system of an organic liquid and a polar cosolvent, the polar cosolvent being less than about 15 wt. % of the solvent system, a viscosity of the solvent system being less than about 1,000 cps: dissolving a neutralized sulfonated polymer in the solvent system to form a solution, a concentration of the neutralized sulfonated polymer in the solution being about 0.5 to about 20 wt. %, a viscosity of the solution being about 5 to about 5,000 cps; and adding about 1 to about 500 vol. % water to the solution having a viscosity less than about 5,000 cps, the water being immiscible with the solution and the polar cosolvent transferring from the solution phase to the water phase thereby causing the viscosity of said solution to increase by a factor of at least 2 to less than 50,000 cps.

2. Description of the Prior Art

There are many applications for very viscous or gelled solution of polymers in organic liquids which are quite diverse. There are also a number of physical and chemical techniques for preparing such systems. The present invention is concerned with a process for converting a relatively low viscosity organic liquid solution of an ionic polymer into a viscous or gelled system via a rapid process which under certain conditions can be reversed. The potential applications for this process and the products derived therefrom will be evident in the instant application.

There are major problems in the direct preparation of polymer solutions or gels via conventional techniques such as polymer dissolution. For example, attempts to form a high viscosity ($>500,000$ cps) solution of polystyrene in a suitable solvent such as xylene can be difficult. The levels of polymer required are either very high (20 to 50 wt. % concentration) or the molecular weight of the polymer must be extremely high. In either event the dissolution process is extremely slow even at elevated temperatures, and even then it is difficult to achieve homogeneous polymer solutions free of local concentrations of undissolved, or poorly dissolved polymer. Thus, the process of achieving such solutions can be difficult and the concentration of polymer in the solution to achieve high viscosities can be uneconomically high.

These are various chemical approaches to the solution of the problems outlined above, that is polymer chain lengthening reactions which can occur to give viscous solutions such as by the reaction of hydroxyl terminated polymers with diisocyanates etc. Such processes have inherent disadvantages which preclude their use in the intended applications of this invention.

The instant invention describes a process which permits (1) the preparation of polymer solutions of sulfonated polymers in organic liquid having reasonably low viscosities (i.e., less than about 5,000 cps), (2) the preparation of viscous solutions or gels from such solutions by the simple process of mixing water with the polymer solution and (3) the reversion of such viscous solutions or gels to relatively low viscosity mixtures by the reincorporation of polar cosolvents which are water immiscible at a desired stage. These operations are achieved by the use of appropriate concentration of polymers having low concentrations of ionic groups present, preferably metal sulfonate groups. Such polymers are described in detail in a number of U.S. Pat. Nos. (3,836,511; 3,870,841; 3,478,854; 3,642,728; 3,921,021) which are herein incorporated by reference. These polymers possess unusual solution characteristics some of which are described in U.S. Pat. No. 3,931,021. Specifically such polymers such as lightly sulfonated polystyrene containing about 2 mole % sodium sulfonate pendant to the aromatic groups are typically not soluble in solvents commonly employed for polystyrene itself. However, the incorporation of modest levels of polar cosolvents permit the rapid dissolution of such ionic polymers to form homogeneous solutions of moderate viscosity.

In the instant process, the role of the polar cosolvent is that of solvating the ionic groups while the main body of the solvent interacts with the polymer backbone. For example, xylene is an excellent solvent for the polystyrene backbone and when combined with 5% methanol readily and rapidly will dissolve the previous example of lightly sulfonated polystyrene.

The remarkable and surprising discovery of the instant invention pertains to the following observation.

When small (or large) amounts of water are combined and mixed with solutions of ionic polymers dissolved in such mixed solvent systems as those described above, it is possible to convert such low viscosity systems into more viscous gels or solutions. Indeed it is possible to achieve increases in viscosity by factors of $10^4$ (10,000) or more by the addition of only 5 to 15% water based on the polymer solution volume.

This unusual behavior is postulated to arise from the removal of the polar cosolvent from the polymer solution phase into a separate aqueous phase. Consequently, when this occurs the physical crosslinking of the ionic groups is again manifested resulting in an increase in solution viscosity. While this postulate is consistent with available data it is intended that this invention not be limited by this operating hypothesis. The resulting gels or thick solutions appear quite homogeneous.

SUMMARY OF THE INVENTION

The present invention relates to a process for forming a viscous polymeric solution or gel having a viscosity of less than 50,000 cps which includes the steps forming a solvent system of an organic liquid and a polar cosolvent, the polar cosolvent being less than about 15 wt. % of the solvent system, the viscosity of the solvent system being less than about 1,000 cps; dissolving a neutralized sulfonated polymer in the solvent system to form a solution the concentration of the neutralized sulfonated polymer in the solution being about 0.5 to about 20 wt. % preferably from 0.8 to about 10 weight %; most preferably about 0.8 to 5 wt. %, a viscosity of the solution being 5 to about 5,000 cps; and adding about 1 to about 500 vol. % water to the solution having a viscosity less than about 5,000 cps, the water being immiscible with the solution and the polar cosolvent transferring from the solution phase to the water phase thereby causing the viscosity of said solution to increase by a factor of at least 2 to less than 50,000 cps.

Accordingly, it is a primary object of the instant invention to describe an economical process for forming a more viscous or gelled solution having a viscosity less than 50,000 cps, preferably less than 20,000 cps; most preferably less than 10,000 cps.

A further object of the instant invention is to provide a process for forming a gel solution which can be used as an encapsulating material, a coating material, as a means of forming a plug within a bore of an elongated member, or as a means of filling an opening in an article. In addition, this technique can be employed as an approach to form lubricating gels or greases which display a significant resistance to flow.

A still further object of the instant invention is to employ the instant process as an integral part of well control procedures which are initiated when unwanted pore fluid influxes have entered the wellbore from subterranean formations. A thin fluid solution, separated from the water base drilling mud by suitable fluid spacers, could be circulated down the drill pipe string and out through the jet nozzles in the drill bit. Upon contacting water in the drill pipe-formation annulus, a viscous gel would be formed that could prevent further pore fluid movement and avoid the risk of a catastrophic well blowout. This type of procedure would have several advantages over current, conventional well control methods which relay on the hydrostatic gradient of a heavy fluid placed in the annulus to control the well in the event of pore fluid influxes.

GENERAL DESCRIPTION

The present invention relates to a process for forming a polymeric solution having a viscosity of less than 50,000 cps which includes the steps of forming a solvent system of an organic liquid and a polar cosolvent, the polar cosolvent being less than about 15 wt. % of the solvent system, a viscosity of the solvent system being less than about 1000 cps; dissolving a neutralized sulfonated polymer in the solvent system to form a solution, a concentration of the neutralized sulfonated polymer in the solution being about 0.5 to about 20 wt. %, a viscosity of the solution being about 5 to about 5,000 cps; and adding about 1 to about 500 vol. % water to the solution having a viscosity less than about 5,000 cps, the water being immiscible with the solution and the polar cosolvent transferring from the solution phase to the water phase thereby causing the viscosity of said solution to increase by a factor of at least 2 to less than 50,000 cps.

If the boiling point of the organic liquid is greater than that of the water or the polar cosolvent, the solution or gel having a viscosity less than 50,000 cps can be heated to a temperature greater than the boiling point of the water and the polar cosolvent but less than that of the organic liquid thereby isolating a gel of the neutralized sulfonated polymer in the organic liquid, when the polar cosolvent and water are boiled off. The formed gel can be further heated to a temperature above the boiling point of the organic liquid thereby removing part of the organic liquid from the liquid so as to cause formation of a more rigid gel. Alternatively, the solution having a viscosity less than 50,000 cps can be heated to a temperature above the boiling point of the organic liquid, polar cosolvent and water thereby removing the organic liquid water and polar solvent from said gel so as to cause formation of the solid neutralized sulfonated polymer. The gel can be coated onto a substrate of an article such as a cloth fabric, a polymeric material, glass, ceramic, metal or wood prior to the heating of the gel. When the gel is subsequently heated a solid neutralized sulfonated polymeric coating will form on the surface of the substrate. Alternatively, the gel could be placed into an opening of the article thereby forming a solid plug within the opening upon application of heat to the gel. The gel could also be placed into the bore of an elongated member such as a pipe thereby forming a plug in the pipe upon application of heat to the gel. The article could also be suspended in the solution having the viscosity of less than 5,000 cps and thereby be encapsulated in the solution having a viscosity less than 50,000 cps, when the water is added to the solution having a viscosity of less than 5,000 cps.

When the solution having a viscosity less than 50,000 cps is formed by the addition of water to the solution having a viscosity less than 5,000 cps, the polar cosolvent rapidly transfers from the solution or gel phase to the aqueous water which is immiscible with the solution phase. The water can be removed from the solution phase by conventional liquid extraction methods. The formation of the solution having a viscosity of less than 50,000 cps from the solution having a viscosity less than 5,000 cps can be quite rapid, on the order of less than 1 minute to about 24 hours, more preferably less than 1 minute to about 30 minutes, and most preferably less than 1 minute to about 10 minutes, however this depends on temperature, shear, solvent type, etc.

The component materials of the instant process generally include an ionomeric polymer such as neutralized sulfonated polymer, an organic liquid, polar cosolvent, and water.

In general, the ionomeric polymer will comprise from about 5 to about 200 meq. pendant ionomeric groups per 100 grams of polymer, more preferably from 10 to 50 meq. pendant ionomeric groups. The ionic groups may be conveniently selected from the group consisting of carboxylate, phosphonate, and sulfonate, preferably sulfonate groups. The ionomers utilized in the instant invention are neutralized with the basic materials selected from Groups IA, IIA, IB, and IIB of the Periodic Table of the Elements and lead, tin, and antimony, as well as ammonium and amine counterions. Ionic polymers which are subject to the process of the instant invention are illimitable and include both plastic and elastomeric polymers. Specific polymers include sulfonated polystyrene, sulfonated t-butyl styrene, sulfonated ethylene copolymers, sulfonated propylene copolymers, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene, and sulfonated elastomers and their copolymers.

Neutralization of the cited polymers with appropriate metal hydroxides, metal acetates, metal oxides or ammonium hydroxide etc. can be conducted by means well known in the art. For example, the sulfonation process as with butyl rubber containing a small 0.3 to 1.0 mole % unsaturation can be conducted in a suitable solvent such as toluene with acetyl sulfate as the sulfonating agent such as described in U.S. Pat. No. 3,836,511. The resulting sulfonic acid derivative can then be neutralized with a number of different neutralization agents such as sodium phenolate and silimar metal salts. The amounts of such neutralization agents employed will normally be equal stoichiometrically to the amount of free acid in the polymer plus any unreacted reagent which still is present. It is preferred that the amount of neutralizing agent be equal to the molar amount of sulfonating agent originally employed plus 10% more to insure full neutralization. The use of more of such neutralization agent is not critical. Sufficient neutralization agent is necessary to effect at least 50% neutralization of the sulfonic acid groups present in the polymer, preferably at least 90%, and most preferably essentially complete neutralization of such acid groups should be effected.

The degree of neutralizatioj of said ionomeric groups may vary from 50 to 500 mole % preferably 90 to 200%. Most preferably it is preferred that the degree of neutralizatioj be substantially complete, that is with no substantial free acid present and without substantial excess of the base other than that needed to insure neutralization. Thus, it is clear that the polymers which are utilized in the instant invention comprise substantially neutralized pendant groups and, in fact, an excess of the neutralizing material may be utilized without defeating the objects of the instant invention.

The ionomeric polymers of the instant invention may vary in number average molecular weight from 1,000 to 10,000,000, preferably from 5,000 to 500,000, most preferably from 10,000 to 200,000. These polymers may be prepared by methods known in the art; for example, see U.S. Pat. No. 3,642,728, hereby incorporated by reference.

It is evident that the polymers covered within this invention encompass a broad class of hydrocarbon polymer systems. It is important that these hydrocarbon polymer backbones (in the absence of the ionic groups) be soluble in the organic liquid whose viscosity is to be controlled. To achieve the desired solubility, it is required that the polymer to be employed possess a degree of polarity consistent with that solvent. This solubility relationship can readily be established by anyone skilled in the art simply by appropriate tests (e.g., Polymer Handbook, Edited by Brandrup and Emmergut, Interscience Publishers, 1967, section IV-341). In the absence of appropriate polymer-solvent compatibility knowledge, this can be determined experimentally by observing whether the selected polymer will be soluble in the solvent at a level of 1 gm. polymer per 100 ml. solvent. If the polymer is soluble, then this demonstrates that it is an appropriate backbone for modification with ionic groups to achieve the objectives of this invention. It is also apparent that polymers which are too polar will not be soluble in the relatively nonpolar organic liquids of this invention. Therefore, only those polymer backbones (i.e., as measured in the absence of ionic groups) having a solubility parameter less than 10.5 are suitable in this invention. This precludes the use of such polymers as polyvinyl alcohol, polyacrylonitrile, etc. Also highly crystalline polymers are to be avoided since they tend not to be soluble in the relatively nonpolar organic liquids employed herein. Therefore, acceptable polymers employed in this invention must possess a level of crystallinity of less than 25%. Thus, these acceptable polymers can be considered substantially non-crystalline.

The preferred ionic copolymers for use in the instant invention, e.g., sulfonated polystyrene and substituted derivatives thereof, may be prepared by the procedures described in U.S. Pat. No. 3,870,841, filed on Oct. 2, 1972, in the names of H. S. Makowski, R. D. Lundberg, and G. H. Singhal hereby incorporated by reference.

The ionomeric polymers may be incorporated into the organic liquid at a level of from 0.5 to 20 weight % preferably from 0.8 to 10 weight %, most preferably from 0.8 to 5 weight % based on the organic liquid and the polar cosolvent.

Specific examples of preferred ionomeric polymers which are useful in the instant invention include sulfonated polystyrene, sulfonated poly-t-butyl styrene, sulfonated polyethylene (substantially noncrystalline), and sulfonated ethylene copolymers, sulfonated polypropylene (substantially noncrystalline), and sulfonated propylene copolymers, sulfonated styrene-methyl methacrylate copolymers, (styrene)-acrylic acid copolymers, sulfonate polyisobutylene, sulfonated ethylene-propylene terpolymers, sulfonated polyisoprene, sulfonated polyvinyl toluene, and sulfonated polyvinyl toluene copolymers.

The ionomeric polymers of the instant invention may be prepared prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well known to those skilled in the art; i.e., coagulation, steam stripping, or solvent evaporation, because the neutralized polymer has sufficient thermal stability to be dried for employment at a later time in the process of the instant invention. It is well known that the unneutralized sulfonic acid derivatives do not possess good thermal stability and the above operations avoid that problem.

It is also possible to neutralize the acid form of these polymers in situ; however, this is not a preferred operation, since in situ neutralization required preparation of the sulfonic acid in the organic liquid which is to be subjected to the instant process, or the acid form of the ionic polymer must be dissolved in said organic liquid. The latter approach may involve handling of an acid form of an ionic polymer which has limited thermal stability. Therefore, it is quite apparent that the preparation and isolation of a neutralized ionic polymer affords the maximum latitude in formulation, less problems in handling polymers of limited thermal stability and maximum control over the final mixture of ionic polymer, polar cosolvent and organic liquid.

The organic liquids, which may be utilized in the instant invention, are selected with relation to the ionic polymer and vice versa. The organic liquid is selected from the group consisting of aromatic hydrocarbons, ketones, chlorinated aliphatic hydrocarbons, aliphatic ethers, paraffinic oils, diesel fuels and organic aliphatic esters and mixtures thereof.

Specific examples of organic liquids to be employed with various types of polymers are:

| Polymer | Organic Liquid |
| --- | --- |
| Sulfonated polystyrene | Benzene, toluene, ethyl benzene, methylethyl ketone, xylene, styrene, ethylene dichloride, methylene chloride |
| Sulfonated poly-t-butyl-styrene | Benzene, toluene, xylene, ethyl benzene, styrene, t-butyl sty- |

| Polymer | Organic Liquid |
|---|---|
| | -continued |
| | rene, aliphatic oils, aromatic oils, hexane, heptane, decane, nonane, pentane |
| Sulfonated ethylene-propylene terpolymer | Aliphatic and aromatic solvents, oils such as Solvent "100 Neutral", "150 Neutral" and similar oils, benzene, diesel oil, toluene, xylene, ethyl benzene, pentane, hexane, heptane, octane, isooctane, nonane, decane aromatic solvents, ketone solvents |
| Sulfonated styrene-methylmethacrylate copolymer | Dioxane, halogenated aliphatics, e.g., methylene chloride, tetrahydrofuran |
| Styrene-acrylic acid copolymers | Aromatic solvents, ketone, solvents, tetrahydrofuran, dioxane, halogenated aliphatics, e.g., methylene chloride |
| Sulfonated polyisobutylene | Saturated aliphatic hydrocarbons, diisobutylene, triisobutylene, aromatic and alkyl substitued aromatic hydrocarbons, chlorinated hydrocarbons, n-butyl ether, n-amyl ether methyl oleate, aliphatic oils, oils predominantly paraffinic in nature and mixtures containing naphthenic hydrocarbons "Solvent 150 Neutral" and all related oils, low molecular weight polymeric oils such as squalene, white oils and process oils having 60% or less aromatic content |
| Sulfonated polyvinyl toluene | Toluene, benzene, xylene, cyclohexane, ethyl benzene, styrene, methylene, chloride, ethylene dichloride. |

The method of the instant invention includes incorporating a polar cosolvent, for example, a polar cosolvent, into the mixture of organic liquid and ionomer, to solubilize the pendant ionomeric groups. The polar cosolvent will have a solubility parameter of at least 10.0, more preferably at least 11.0 and is water miscible and may comprise from 0.1 to 40, preferably 0.5 to 20 weight % of the total mixture of organic liquid, ionomeric polymer, and polar cosolvent. The solvent system of polar cosolvent and organic liquid in which the neutralized sulfonated polymer is dissolved contains less than about 15 wt. % of the polar cosolvent, more preferably about 2 to about 10 wt. %, and most preferably about 2 to about 5 wt. %. The viscosity of the solvent system is less than about 1,000 cps, more preferably less than about 800 cps and most preferably less than about 500 cps.

Normally, the polar cosolvent will be a liquid at room temperature; however, this is not a requirement. It is preferred but not required that the polar cosolvent be soluble or miscible with the organic liquid at the levels employed in this invention. The polar cosolvent is selected from the group consisting essentially of water soluble alcohols, amines, di- or trifunctional alcohols, amides, acetamides, phosphates, or lactones and mixtures thereof. Especially preferred polar cosolvents are aliphatic alcohols such as methanol, ethanol, n-propanol, isopropanol, 1,2-propane diol, monomethyl ether of ethylene glycol, and n-ethylformamide.

The amount of water added to the solution of neutralized sulfonated polymer, organic liquid and polar cosolvent having a viscosity of less than about 5,000 cps, is about 1 to about 500 vol. % of water, more preferably about 5 to about 300 vol. % water, and most preferably about 10 to about 200 vol. % water.

In the case of reversion of the polymeric gel by the addition of water immiscible polar cosolvent, the concentration of polar cosolvent added is about 0.5 to about 30 wt. %, more preferably about 1 to about 20 wt. %, and most preferably about 2 to about 10 wt. %.

DETAILED DESCRIPTION OF THE PREFERRED EMBODIMENT

EXAMPLE 1

Solutions were prepared at 5% (5 gms/100 ml) concentrations of 2 mole % sodium sulfonated polystyrene (S-PS) in 5% methanol/xylene (vol/vol) and 5% hexanol/xylene, and of sulfonated EPDM (about 1.0 mole % zinc sulfonate) in 5% isopropanol/heptane and 5% methanol/xylene.

To 50 ml samples of each solution, varying percentage levels of water (by volume) were added while stirring rapidly with a high speed stirrer. Brookfield viscosities of the stock solutions and each sample after water addition were obtained at 25° C.

Viscosity data are summarized on Table 1 for the S-PS solutions; Table 2 for the sulfo-EPDM solutions.

S-PS

The addition of water to S-PS in methanol/xylene produces a milky solution or gel. Viscosity increases exponentially from about 8 cps for the stock solution to 384,000 cps with 14% water added. Beyond this level of water addition, solid gels were obtained with viscosities above the range of the Brookfield measuring capability. Excess water was seen to separate from the thickened solutions at water levels of 10% and above.

The solution viscosity of the S-PS in hexanol/xylene stock solution was considerably higher (458 cps) than the methanol/xylene solution. The addition of 1 and 2% water resulted in milky solutions with slight increases in viscosity (612 cps at 2% water level). At a level of 14% water, viscosity had increases to only 914 cps. This experiment clearly demonstrates that the use of a water immiscible alcohol such as hexanol does not provide a gel as shown above with methanol.

Sulfo EPDM

The solution of Sulfo EPDM in isopropanol/heptane displayed phase separation upon standing into two indistinct layers which made viscosity readings somewhat erratic. The addition of water followed by agitation permitted reproducible readings over a range of water levels. This solution, therefore, was examined by removing 50 ml samples, adding aliquots of water and stirring vigorously. At water addition levels of 6 to 12%, uniform viscous solutions resulted and viscosities were obtained. At levels of 14% water and above, gelation became too thick for viscosity measurements.

The solution of Sulfo EPDM in methanol/xylene was examined as above. Water was added to 50 ml samples at levels of 6, 8, 10 and 12%. Milky, thick solutions were obtained up to the 10% water level and viscosities obtained. At a level of 12% water solid gelation occurs.

EXAMPLE 2

Using Sulfo EPDM (prepared with an EPDM having a Mooney viscosity of 40 (212° F.) sulfonated to a level of 15 milliequivalents/100 gm. of zinc acetate) solutions were prepared in isopropanol/xylene and methanol/xylene at various concentrations as shown in Table 3. To each solution water was added with a high speed stirrer at levels ranging from 1 to 10% and viscosities obtained of the resulting mixtures. Viscosity data are shown in Table 3. Initially, cloudy to milky solutions resulted with milkyness increasing with increased water addition. After viscosities were obtained, each solution was allowed to stand in a capped jar, there was some indication of phase separation. Phase separation appeared most pronounced in the most dilute systems. The viscosity of the supernatant liquid did not appear significantly affected by phase separation.

It is apparent from the viscosity levels in Table 3 that at polymer levels of 1% and above, the addition of water to polymer solutions with 5% isopropanol or methanol results in significant viscosity increases at water additions of 1 to 10%. However, at lower polymers levels (i.e., 0.5%) the viscosities after addition of water do not substantially increase. Under these conditions it is observed that the most pronounced phase separation is obtained. It is surmised that at such dilute polymer contents it is more difficult to create an ionic network throughout the hydrocarbon phase and therefore, phase separation occurs rather than the desired viscosity increase.

The preceding experiments demonstrate conclusively that the process envisioned for these ionic polymers in mixed solvents is useful in preparing gels. It is also evident that this process is applicable to a number of different polymer backbones containing pendant metal sulfonate groups. For example, copolymers of butadiene or isoprene with metal sulfonate containing vinyl monomers would also be useful in this invention. The preferred level of metal sulfonate groups pendant to the polymer backbone is in the range of 10 meq./100 gm up to 200 meq./100 gm of polymer. Similarly, the level of polymer in the mixed solvent can be varied over a wide range which is from about 1 weight percent up to 20 weight percent. Similarly, the alcohol level varies from below 2 percent to less than 15 weight percent based on total solvent (hydrocarbon solvent and alcohol).

It has generally been observed that increasing the amount of water with the polymer solution increases the strength of the gel. Levels of water in excess of 50 volume percent have been employed successfully and higher levels can be employed. The preferred levels of water are not believed to be critical provided that levels of greater than 5 volume percent are employed (based on volume of hydrocarbon-alcohol solution).

In addition, to the variables delineated above, other additives can be employed to increase gel strength, if desired. For example, the addition of clays, fillers (calcium carbonate, zinc oxide), carbon black and the like can be employed to strengthen the gels.

The experiments described heretofore are concerned only with the preparation of a gel and not its reversion. It has been observed that the gels of the present invention can be dispersed simply by the addition of a polar cosolvent which is miscible with the hydrocarbon phase and immiscible with water. Thus, a gel formed from sulfonated polystyrene [5% of S-PS containing 2 mole % sodium sulfonate in methanol/xylene (95/5)] by mixing about 40 vol. % water is a stiff gel. The addition of about 5 volume percent of hexanol-1 to the entire mixture followed by agitation provides a fluid emulsion of very low viscosity. This reverse process can be effected with those alcohols and polar cosolvents which are not water miscible and, therefore, are primarily dissolved in the hydrocarbon phase.

TABLE I

VISCOSITIES OF SULFO-POLYSTYRENE SOLUTIONS* AT VARIOUS WATER CONTENTS WITH METHANOL AND HEXANOL AS COSOLVENTS

|  | 0% $H_2O$ | | 1% $H_2O$ | | 2% $H_2O$ | | 4% $H_2O$ | | 6% $H_2O$ | |
|---|---|---|---|---|---|---|---|---|---|---|
| Alcohol | RPM | Vis-UL | RPM | Vis-UL | RPM | Vis-#2 | RPM | Vis-#2 | RPM | Vis-#4 |
| Methanol | 60 | 7.7 | 12 | 40.6 | 60 | 403 | 1.5 | 10,360 | 12 | 33,350 |
|  | 30 | 7.4 | 6 | 39.4 | 30 | 402 | .6 | 9,900 | 6 | 33,000 |
|  | 12 | 6.5 | 3 | 39.4 | 12 | 350 | .3 | 10,000 | 3 | 32,000 |
|  | RPM | Vis-#1 | RPM | Vis-#2 | RPM | Vis-#2 | RPM | Vis-#2 | RPM | Vis-#2 |
| Hexanol | 12 | 458 | 30 | 570 | 30 | 612 | 30 | 654 | 30 | 705 |
|  | 6 | 460 | 12 | 570 | 12 | 600 | 12 | 655 | 12 | 705 |
|  | 3 | 464 | 6 | 570 | 6 | 590 | 6 | 660 | 6 | 690 |

|  | 8% $H_2O$ | | 10% $H_2O$ | | 12% $H_2O$ | | 14% $H_2O$ | |
|---|---|---|---|---|---|---|---|---|
| Alcohol | RPM | Vis-#4 | RPM | Vis-#4 | RPM | Vis-#4 | RPM | Vis-#4 |
| Methanol | 6 | 90,200 | 1.5 | 338,800 | 1.5 | 284,000 | 1.5 | 384,000 |
|  | 3 | 91,400 | .6 | 335,000 | .6 | 278,000 | .6 | 386,000 |
|  | 1.5 | 84,000 | .3 | 340,000 | .3 | 260,000 | .3 | 380,000 |
|  | RPM | Vis-#2 | RPM | Vis-#2 | RPM | Vis-#2 | RPM | Vis-#2 |
| Hexanol | 30 | 738 | 30 | 774 | 30 | 860 | 30 | 914 |
|  | 12 | 735 | 12 | 775 | 12 | 860 | 12 | 915 |
|  | 6 | 690 | 6 | 750 | 6 | 840 | 6 | 890 |

*95% xylene/5% Alcohol (V/V) containing 5% by weight of sulfonated Polystyrene (2 mole percent sodium sulfonate) was employed as starting solution.

TABLE II

VISCOSITIES OF SULFONATED ETHYLENE/PROPYLENE DIENE TERPOLYMER SOLUTIONS* AT VARIOUS WATER CONTENTS IN TWO SOLVENT SYSTEMS

| | 0% $H_2O$ | 6% $H_2O$ | 8% $H_2O$ |
|---|---|---|---|

TABLE II-continued

VISCOSITIES OF SULFONATED ETHYLENE/PROPYLENE DIENE TERPOLYMER SOLUTIONS* AT VARIOUS WATER CONTENTS IN TWO SOLVENT SYSTEMS

| Alcohol/Solvent | RPM | Vis-#4 | RPM | Vis-#4 | RPM | Vis-#4 |
|---|---|---|---|---|---|---|
| ISOPROPANOL/HEPTANE | 60 | ERRATIC READINGS | 60 | 3,200 | 60 | 6,500 |
|  | 3 |  | 30 | 3,600 | 30 | 6,500 |
|  | RPM | Vis-UL | 12 | 5,500 | 12 | 9,500 |
|  | RPM | Vis-UL | RPM | VIS-#4 | RPM | Vis-#4 |
| METHANOL/XYLENE | 30 | 116 | 12 | 32,000 | 6 | 83,500 |
|  | 12 | 123 | 6 | 43,500 | 3 | 117,000 |
|  | 6 | 123 | 3 | 64,000 | 1.5 | 170,000 |

|  | 10% H$_2$O | | 12% H$_2$O | |
|---|---|---|---|---|
| Alcohol/Solvent | RPM | Vis-#4 | RPM | Vis-#4 |
| ISOPROPANOL/HEPTANE | 30 | 16,040 | 12 | 33,900 |
|  | 12 | 20,500 | 6 | 47,500 |
|  | 6 | 28,400 | 3 | 70,000 |
|  | RPM | Vis-#4 | RPM | Vis-#4 |
| METHANOL/XYLENE | .6 | 712,000 |  |  |
|  | .3 | 824,000 |  | Too Gelled |

*SULFONATED EPDM CONTAINED about 1 mole percent zinc sulfonate or about 30 milliequivalents sulfonate/100 gms. polymer and was dissolved at a level of 5 weight percent in 95/5 solvent/alcohol mixture.

TABLE III

EFFECT ON VISCOSITY-ADDITION OF WATER TO (15 MEQ. SULFO EPDM, 45 MEQ. ZnAc$_2$, SULFO EPDM 40M$_L$ EPDM IN ISOPROPANOL OR METHANOL/XYLENE

| Concentration SULFO-EPDM % | Alcohol | % Alcohol | Viscosity, cps at 25° C. at Various Levels of % Water Addition | | | | |
|---|---|---|---|---|---|---|---|
|  |  |  | 0 | 1 | 2.5 | 5 | 10 |
| 0.5 | Isopropanol | 3 | 1.23 | 1.28 | 1.34 | 1.35 | 1.42 |
| 1 | " | 5 | 2.79 | 3.33 | 4.0 | 4.68 | 6.78 |
| 2 | " | 5 | 14.0 | 25.6 | 30.7 | 40.0 | 90.4 |
| 2 | " | 10 | 14.2 | 11.3 | 13.4 | 16.8 | 25.3 |
| 0.5 | Methanol | 5 | 1.21 | 1.4 | 1.52 | 1.72 | 1.73 |
| 1 | " | 5 | 2.3 | 3.44 | 5.42 | 13.8 | 46.8 |

What is claimed is:

1. A process for increasing the low shear solution viscosity which includes the steps of:
   (a) forming a solvent system of an organic liquid and a polar cosolvent, said polar cosolvent being less than about 15 wt. % of said solvent system, a viscosity of said solvent system being less than about 1,000 cps;
   (b) dissolving a neutralized solfonated polymer in said solvent system to form a solution, a concentration of said neutralized sulfonated polymer in said solution being about 0.5 to about 20 wt. %, a viscosity of said solution being about 5 to about 5,000 cps; and
   (c) adding about 1 to about 500 volume % water to said solution, said water being immiscible with said solution, with said polar cosolvent transferring from said solution to said water causing the viscosity of said solution or suspension to increase at least a factor of 2 but being less than 50,000 cps.

2. A process according to claim 1, wherein said organic liquid has a boiling point greater than said polar cosolvent or said water.

3. A process according to claim 2, further including the step of heating said solution having a viscosity of less than 50,000 cps to a temperature greater than the boiling point of said water and said polar cosolvent, but less than that of said organic liquid thereby isolating a water insoluble gel of said neutralized sulfonated polymer in said organic liquid.

4. A process according to claim 3, further including heating said solution or water insoluble gel to a temperature above the boiling point of said organic liquid thereby removing said organic liquid from said gel to form a solid neutralized sulfonated polymer.

5. A process according to claim 3, further including the step of depositing said gel on a substrate prior to heating said gel to said temperature above said boiling point of said organic liquid thereby forming a coating of said neutralized sulfonated polymer on said substrate.

6. A process according to claim 1 further including the step of heating said solution and said water to a temperature above the boiling points of said water, said polar cosolvent, and said organic liquid forming free neutralized sulfonated polymer.

7. A process according to claim 1, further including the step of separating said water from said solution having a viscosity less than 50,000 cps thereby forming a water insoluble gel of said neutralized sulfonated polymer in said organic liquid.

8. The water insoluble gel prepared by the process of claim 3.

9. The water insoluble gel prepared by the process of claim 7.

10. A process according to claim 7, further including suspending an article in said solution having a viscosity less than about 5,000 cps, thereby permitting said water insoluble gel to be encapsulated within said substance having a viscosity at least two times that of the solution but less than 50,000 cps upon the addition of said water to said solution having a viscosity less than about 5,000 cps.

11. The water insoluble gel prepared by the process of claim 10.

12. A process according to claim 1, further including an article having an opening therein and forming said solution having a viscosity less than 50,000 cps within said opening.

13. A process according to claim 1, further including an elongated member having a bore therein and forming said solution having a viscosity less than 50,000 cps within said bore.

14. A process according to claim 1, wherein said neutralized sulfonated polymer has about 5 to about 200 meq. of pendant $SO_3H$ groups per 100 grams of polymer.

15. A process according to claim 14, wherein said $SO_3H$ are neutralized with an ammonium or metal counterion.

16. A process according to claim 15, wherein said metal counterion is selected from the group consisting of antimony, tin, lead and Groups IA, IIA, IB and IIB of the Periodic Table of Elements.

17. A process according to claim 15, wherein said $SO_3H$ groups are at least 90 mole % neutralized.

18. A process according to claim 1, wherein said neutralized sulfonated polymer is formed from an elastomeric polymer.

19. A process according to claim 18, wherein said elastomeric polymer is selected from the group consisting of EPDM terpolymer or Butyl rubber.

20. A process according to claim 1, wherein said neutralized sulfonated polymer is formed from a thermoplastic.

21. A process according to claim 20, wherein said thermoplastic is selected from the group consisting of polystyrene, t-butyl styrene, ethylene copolymers, propylene copolymers, and styrene/acrylonitrile copolymer.

22. A process according to claim 1, wherein said neutralized sulfonated polymer further includes a filler admixed therewith.

23. A process according to claim 1, wherein said neutralized sulfonated polymer further includes a polymeric substance admixed therewith.

24. A process according to claim 1, wherein said polar cosolvent has a greater polarity than said organic liquid.

25. A process according to claim 1, wherein said polar cosolvent is selected from the group consisting of aliphatic alcohols, aliphatic amines, di- or tri functional aliphatic alcohols, water miscible amides, acetamides, phosphates, and lactones and mixtures thereof.

26. A process according to claim 1, wherein said polar cosolvent is selected from the group consisting of methanol, ethanol, propanol, and isopropanol, and mixtures thereof.

27. A process according to claim 1, wherein said polar cosolvent has a solubility parameter of at least about 10 and is water miscible.

28. A process according to claim 1, wherein said organic liquid is selected from the group consisting of aromatic hydrocarbons, ketones, chlorinated aliphatic hydrocarbons, aliphatic hydrocarbons, cyclic aliphatic ethers, aliphatic ethers and organic aliphatic esters and mixtures thereof.

29. A process according to claim 1, wherein said organic liquid is selected from the group consisting of aliphatic hydrocarbons and aromatic hydrocarbons.

30. A process according to claim 1, wherein said organic liquid is selected from the group consisting of benzene, toluene, ethyl benzene, xylene and styrene and mixtures thereof.

31. A process according to claim 30, wherein said neutralized sulfonated polymer is formed from polystyrene.

32. The water insoluble prepared by the process of claim 3, wherein said neutralized sulfonated polymer is formed from polystyrene and said organic liquid is selected from the group consisting of benzene, toluene, ethyl benzene, xylene and styrene and mixtures thereof.

33. A process according to claim 7, further including adding additional said water immiscible polar cosolvent to said gel thereby recreating said solution having a viscosity of less than 50,000 cps, said solution including said polar cosolvent, said organic liquid and said neutralized sulfonated polymer.

34. The process of claim 1 where the viscosity of the solution is less than 5,000 cps and increases with water addition to greater than a factor of two but less than 50,000 cps.

35. A process according to claim 1, wherein said organic liquid is selected from the group consisting of oils which are predominantly paraffinic in composition.

36. A process according to claim 1, wherein said organic liquid is selected from the group consisting of aromatic hydrocarbons, and diesel fuels and paraffinic oils.

* * * * *